United States Patent
Ewing et al.

(10) Patent No.: US 6,270,742 B1
(45) Date of Patent: Aug. 7, 2001

(54) HYDROGEN FLUORIDE RECOVERY PROCESS

(75) Inventors: Paul Nicholas Ewing; Charles John Shields, both of Warrington; Christopher Roberts, Prescot, all of (GB)

(73) Assignee: Imperial Chemical Industries PLC, London (GB)

( * ) Notice: Subject to any disclaimer, the term of this patent is extended or adjusted under 35 U.S.C. 154(b) by 0 days.

(21) Appl. No.: 09/051,508

(22) PCT Filed: Sep. 24, 1996

(86) PCT No.: PCT/GB96/02348
  § 371 Date: Apr. 8, 1998
  § 102(e) Date: Apr. 8, 1998

(87) PCT Pub. No.: WO97/13719
  PCT Pub. Date: Apr. 17, 1997

(30) Foreign Application Priority Data

Oct. 10, 1995 (GB) .................................. 9520644
Oct. 10, 1995 (GB) .................................. 9520645
Jun. 10, 1996 (GB) .................................. 9612117
Jun. 10, 1996 (GB) .................................. 9612118

(51) Int. Cl.[7] ........................................... C01B 7/19
(52) U.S. Cl. .................... 423/484; 423/483; 423/488; 210/753
(58) Field of Search .................... 423/483, 484, 423/488; 210/753, 767

(56) References Cited

U.S. PATENT DOCUMENTS

| | | | |
|---|---|---|---|
| 3,947,558 | 3/1976 | Theodorus | 423/483 |
| 5,032,371 | 7/1991 | Buehler | 423/484 |
| 5,276,225 | * 1/1994 | Berthe | 570/178 |
| 5,362,469 | 11/1994 | Seseke-Koyro et al. | 423/484 |
| 5,382,724 | * 1/1995 | Ohno et al. | 570/178 |
| 5,616,819 | * 4/1997 | Boyce et al. | 570/167 |
| 5,632,966 | * 5/1997 | Van Der Puy et al. | 423/484 |
| 5,707,497 | * 1/1998 | Galland et al. | 423/488 |
| 5,948,381 | * 9/1999 | Eibeck et al. | 423/484 |
| 6,001,796 | * 12/1999 | Pham et al. | 510/408 |

FOREIGN PATENT DOCUMENTS

| | | |
|---|---|---|
| 596514 | 5/1994 | (EP) . |
| 0 596 514 | 5/1994 | (EP) . |
| 1332968 | 10/1973 | (GB) . |
| 1 332 968 | 10/1973 | (GB) . |
| WO 94 20412 | 9/1994 | (WO) . |
| WO 94/20412 | 9/1994 | (WO) . |
| WO 95/27688 | 10/1995 | (WO) . |
| WO 97/13719 | 4/1997 | (WO) . |

OTHER PUBLICATIONS

Database WPI Section Ch, Week 9420 Derwent Publications Ltd. London, GB; Class E16, AN 94–163857 XP002020352 & JP, A, 06 107 570 (Showa Denko KK), Apr. 19, 1994 Abstract.

Database WPI Section Ch, Week 9333 Derwent Publications Ltd., London, GB; Class E16, AN 93–261601 XP002020353 & JP, A, 05 178 768 (Showa Denko KK), Jul. 20, 1993 Abstract.

Database WPI Week 7502 Derwent Publications Ltd., London, GB; AN 75–02816w XP002020354 & JP, A, 49 045 842 (Electro Chem Ind Co Ltd), Dec. 6, 1974 Abstract.

Database WPI Week 7718 Derwent Publications Ltd., London, GB; AN 77–31432y XP002020355 & JP, A, 50 097 594 (Mitsubishi Gas Chem Ind), Aug. 2, 1975 Abstract.

U.S. Patent Application 09/402,681, Oct. 1999.*

* cited by examiner

Primary Examiner—Ngoc-Yen Nguyen
(74) Attorney, Agent, or Firm—Cook, Alex, McFarron, Manzo, Cummings & Mehler, Ltd.

(57) ABSTRACT

A process for separating and recovering hydrogen fluoride from a mixture with an organic compound especially a fluorine-containing compound by extraction with a solution of an alkali metal fluoride in hydrogen fluoride, phase separation and recovery. A process for producing a fluorinecontaining organic compound by fluorinating a starting material with hydrogen fluoride and similarly recovering hydrogen fluoride from the product stream. The solution may be anhydrous or aqueous.

16 Claims, 1 Drawing Sheet

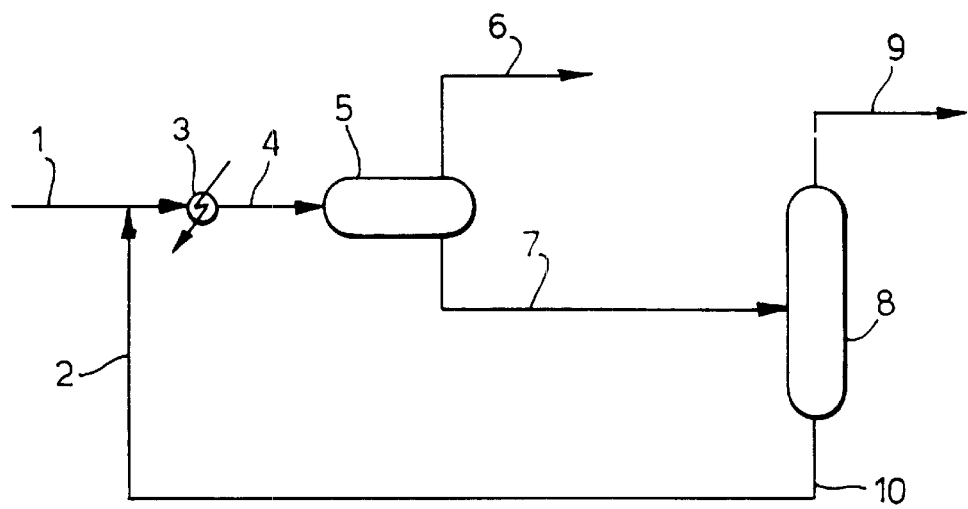

HYDROGEN FLUORIDE RECOVERY PROCESS

This invention relates to a hydrogen fluoride recovery process and particularly to a process for separating hydrogen fluoride from organic compounds and recovering the separated hydrogen fluoride. The invention is particularly useful for recovering hydrogen fluoride from mixtures containing minor proportions, for instance less than 25% by weight, of hydrogen fluoride and for recovering hydrogen fluoride from mixtures in which the organic compound(s) and hydrogen fluoride form an azeotropic or near-azeotropic composition. A particular embodiment of the process resides in separating hydrogen fluoride from halogen-containing organic compounds, notably fluorine-containing organic compounds, and recovering the hydrogen fluoride.

Fluorine-containing organic compounds such as hydrofluorocarbons (HFCs), hydrochloro-fluorocarbons (HCFCs) and chlorofluorocarbons (CFCs) are often produced by reacting a halocarbon starting material containing one or more atoms other than fluorine, especially chlorine atoms, with hydrogen fluoride in the liquid phase or the gaseous phase in the presence of a fluorination catalyst. The product from such reactions comprises the desired fluorine-containing organic compound, organic by-products, hydrogen chloride and unreacted hydrogen fluoride and other starting materials and it is desirable to separate these materials and recover as much as possible of the hydrogen fluoride for re-use. A proportion of the hydrogen fluoride usually can be separated and recovered by distillation but the resulting distillate usually contains residual hydrogen fluoride especially in cases where the organic compound(s) and hydrogen fluoride form an azeotrope. This residual hydrogen fluoride is usually removed from the organic compound(s) by scrubbing the product stream with water or preferably aqueous alkali and the aqueous scrubbing liquor is then disposed of after appropriate waste water treatment. Whilst aqueous scrubbing is an effective way of removing hydrogen fluoride from the organic compound(s), it tends to be expensive in terms of hydrogen fluoride loss from the process and it is desirable to separate as much as possible and preferably essentially all of the hydrogen fluoride from the product stream before aqueous scrubbing.

According to the present invention there is provided, in a first aspect, a process for separating and recovering hydrogen fluoride from a mixture of an organic compound and hydrogen fluoride which comprises contacting the mixture in the liquid phase with a solution of an alkali metal fluoride in hydrogen fluoride, effecting phase separation of an upper organic compound phase and a lower hydrogen fluoride phase and recovering hydrogen fluoride from the lower hydrogen fluoride phase.

Whilst any alkali metal fluoride may be used, ewe prefer potassium fluoride or caesium fluoride, especially caesium fluoride. If desired, mixtures of two or more alkali metal fluorides may be employed.

The solution of alkali metal fluoride in hydrogen fluoride may be essentially anhydrous if desired. As an alternative, a solution of an alkali metal fluoride in aqueous hydrogen fluoride may be employed.

The mixture of organic compound(s) and hydrogen fluoride being treated may be essentially anhydrous since anhydrous hydrogen fluoride is essentially non-corrosive. Where the solution of alkali metal fluoride in hydrogen fluoride is essentially anhydrous, the mixture of organic compound(s) and hydrogen fluoride is preferably essentially anhydrous. Whilst water may be present in the process, the advantage of non-corrosivity associated with anhydrous hydrogen fluoride is reduced by the presence of water. An aqueous solution however provides the advantage that, for a given concentration of alkali metal in the solution, a higher level of recovery of hydrogen fluoride from the mixture of organic compound and hydrogen fluoride may be secured. Accordingly, an anhydrous or an aqueous solution will be selected according to the particular advantage which is desired in a given process.

In order to improve the yield of hydrogen fluoride recovered from the said mixture, the upper organic compound phase may subsequently be contacted again with a solution of an alkali metal fluoride in hydrogen fluoride from which a further upper organic compound phase and a further lower hydrogen fluoride phase may be recovered. This procedure may be repeated as often as desired. The first and, if present, subsesequent separation step(s) may suitably be carried out in one or more mixer/settler units or a liquid/liquid extraction column as desired.

The upper, organic phase can be separated and treated in an appropriate manner such as distillation, for example in a distillation column to recover the organic compound and/or to obtain a recycle stream for feeding to the reactor in which the desired organic compound is produced. This phase, whilst depleted in hydrogen fluoride, will usually contain some residual hydrogen fluoride and during distillation to recover the desired organic compound will provide one or more streams containing hydrogen fluoride which may be recycled. The recycle stream(s) may be fed to the reactor in which the organic compound is produced or to a process stream containing the organic compound for example the mixture of an organic compound and hydrogen fluoride as described in the first aspect of the invention. Any hydrogen fluoride which remains in the recovered organic compound can be recovered for example by distillation or removed by aqueous scrubbing.

The lower, hydrogen fluoride phase will usually be distilled to recover essentially anhydrous hydrogen fluoride therefrom. The distillation may be carried in any conventional distillation apparatus for example a distillation column, but is preferably carried out in a flash vessel, for example a single-stage flash vessel which is suitably equipped with a reboiler and condenser.

The hydrogen fluoride recovered from the lower phase can be collected for use in another reaction or recycled to the reactor in which the organic compound is produced. This lower phase, enriched in hydrogen fluoride extracted from the product stream being treated will usually also contain some organic compound(s) extracted from the product stream being treated. Distillation of the phase removes any such organic compound(s) together with hydrogen fluoride; this mixture may then be subjected to further separation to remove at least a part of the hydrogen fluoride from the organic compound. The organic compound(s) may then be recycled as described above to the reactor in which the desired organic compound is produced or to a process stream containing the organic compound.

The solution of alkali metal fluoride in hydrogen fluoride obtained as residue on distilling the lower phase to recover hydrogen fluoride can be recycled to the process and re-used to extract hydrogen fluoride from the mixture being treated.

The density of a solution of alkali metal fluoride in hydrogen fluoride increases with increasing concentration of alkali metal fluoride so that the extractant solution is denser than the organic compound(s) and separates as the lower phase during phase separation. The density of the extractant solution is preferably appreciably greater than that of the organic compound(s) so that as its density falls by dilution with hydrogen fluoride extracted from the mixture being treated it does not approach closely the density of the organic compound(s) and there remains a sufficient difference in density to enable efficient phase separation to be effected. The amount of alkali metal fluoride in the extractant solution may vary within wide limits, depending upon the particular organic compound(s) in the mixture being treated and hence the required density of the extractant solution and the solubility of the alkali metal fluoride in the hydrogen fluoride. As a guide, the concentration of alkali metal fluoride, for example caesium fluoride, will typically be from about 20% to about 80% by weight and preferably not more than about 70%. Where potassium fluoride is employed it is suitably present at a level from 20 to 40% by weight. However, it is to be understood that amounts outside the broad range may be appropriate in certain cases: saturated solutions may be advantageous in some cases.

The solution of alkali metal fluoride in hydrogen fluoride is polar so that the mutual solubility of the organic compound(s) and hydrogen fluoride is reduced whereby a greater amount of hydrogen fluoride can be separated from the organic compound(s) than can be separated by simple phase separation of hydrogen fluoride and the organic compound.

The treatment of the mixture with the solution of alkali metal fluoride in hydrogen fluoride may be effected under any combination of temperature and pressure conditions whereby the mixture being treated and the alkali metal fluoride solution are in the liquid phase. Atmospheric, superatmospheric or subatmospheric pressure may be employed although we prefer to employ superatmospheric pressure up to about 30 bar. The operating temperature will usually be from about $-30°$ C. to about $35°$ C., preferably from about $0°$ C. to about $25°$ C. although it is to be understood that lower or higher temperatures may be employed if low or high pressure is employed.

The process of the invention can be applied to mixtures containing any amount of hydrogen fluoride although it is clearly advantageous in the case of mixtures containing large amounts of hydrogen fluoride to remove some of the hydrogen fluoride by simple distillation before treating the mixtures according to the invention. Thus the product stream from a reactor in which the organic compound(s) is/are produced will usually be distilled and if desired otherwise treated to remove some hydrogen fluoride, any hydrogen chloride which may be present and by-products so as to provide a concentrated mixture for treatment according to the invention. Usually, the mixture to be treated will contain less than about 20% by weight, typically less than about 10% by weight of hydrogen fluoride.

The process is applicable to separation and recovery of hydrogen fluoride from mixtures thereof with any organic compound which has a mutual solubility with hydrogen fluoride such that their separation is not readily achieved by simple phase separation. Of particular interest is the treatment of mixtures containing organic compounds which form an azeotropic or azeotrope-like composition with hydrogen fluoride and from which the hydrogen fluoride cannot be removed by simple distillation. Most hydrofluorocarbons, hydrochlorofluorocarbons and hydrofluoroethers form azeotropes or azeotrope-like mixtures with hydrogen fluoride and the treatment of such mixtures is a preferred embodiment of the invention, especially the treatment of mixtures wherein the organic compound is a hydrofluoroalkane, a hydrochlorofluoroalkane, a chlorofluoroalkane or a hydrofluoroether. It is to be understood, however, that the invention is not limited to the treatment of specific types of organic compound but is applicable to all organic compounds from which the separation and removal of hydrogen fluoride is not readily achieved by simple distillation.

Where the organic compound is a hydrofluoroalkane, hydrochlorofluoroalkane or chlorofluoroalkane, it will usually contain from 1 to 6 carbon atoms and preferably from 1 to 4 carbon atoms. Particular embodiments of the process reside in the treatment of mixtures wherein the organic compound is one or more of 1,1,1,2-tetrafluoroethane [HFC 134a], 1,1,2,2-tetrafluoroethane [HFC 134], chloro-1,1,1-trifluoroethane [HCFC 133a], chlorotetrafluoroethane [HCFC124/124a], pentafluoroethane [HFC 125], difluoromethane [HFC 32], chlorodifluoromethane [HCFC 22], 1,1-difluoroethane [HFC 152a], 1,1,1-trifluoroethane [HFC 143a], 1,1,1,3,3 pentafluoropropane [HFC 245fa], 1,2,2,3,3-pentafluoropropane [HFC 245ca] and 1,1,1,2,3,3,3-heptafluoropropane [HFC 227ea]. Where the organic compound is a hydrofluoroether, it may contain from 2 to 8 carbon atoms and usually 2 to 6 carbon atoms. A preferred embodiment of the invention resides in treating a mixture in which the organic compound is one or more dimethyl ether, for example bis(fluoromethyl) ether [BFME], 1,1-difluorodimethyl ether. 1,1,1-trifluorodimethyl ether and pentafluorodimethyl ether.

Another aspect of the invention provides a process for the production of a fluorine-containing organic compound by reacting an organic, preferably halocarbon starting material with hydrogen fluoride in the gaseous phase in the presence of a fluorination catalyst or in the liquid phase to produce a product stream comprising the fluorine-containing organic compound and unreacted hydrogen fluoride, contacting the product stream, preferably in the liquid phase, with a solution of an alkali metal fluoride in hydrogen fluoride, effecting phase separation of an upper phase comprising the fluorine-containing organic compound and a lower hydrogen fluoride phase and recovering hydrogen fluoride from the lower hydrogen fluoride phase.

The product stream may be treated prior to contact with the solution of alkali metal fluoride in hydrogen fluoride for example in order to remove compounds other than the desired fluorine-containing compound from the product stream. The treatment, where employed, may include any conventional separation process for example distillation and phase separation.

The organic starting material is selected according to the desired fluorine-containing organic compound. The starting material may be a halocarbon and so contain one or more halogen atoms, especially chlorine and/or fluorine atoms, and may also contain hydrogen. For example, to produce difluoromethane, bis(fluoromethyl)ether (BFME) or methylene chloride may be employed as the halocarbon starting material, to produce 1,1,1,2-tetrafluoroethane the starting material may comprise trichloroethylene and/or 1,1,1-trifluorochloroethane, to produce pentafluoroethane, perchloroethylene may be employed as the halocarbon starting material and to produce chlorodifluoromethane, chloroform may be suitably employed as the halocarbon starting material.

However, for certain products the starting material need not contain a halogen atom, for example, BFME may be produced by contacting hydrogen fluoride with formaldehyde as described in our earlier prior published European Patent Applications EP-A-518506 or EP-A-612309. Another example of a halogen-free organic starting which may be employed is acetylene which may be reacted with hydrogen fluoride to produce HFC 152a.

Difluoromethane may be produced from BFME in the liquid or gaseous phase, for example as described in our earlier prior published European Patent Application EP-A-518506. In a gaseous phase reaction the BFME starting material may be introduced into a heating zone in undiluted form although, depending upon the process employed for the production of the BFME vapour, the material may be fed into the heating zone in conjunction with a diluent such as an inert carrier gas, for example nitrogen. The temperature to which the BFME is heated to produce difluoromethane is such that the bis(fluoromethyl)ether is in the vapour phase and the temperature will typically be at least 80° C., preferably at least 200° C. and more preferably at least 250° C. The temperature need be no higher than about 500° C. although higher temperatures say up to about 700° C., may be used if desired.

The BFME is suitably heated in the presence of hydrogen fluoride vapour. The hydrogen fluoride may be used as the diluent or carrier gas with which the BFME is introduced into the reaction zone or the hydrogen fluoride may be introduced into the reaction zone separately.

In producing 1,1,1,2-tetrafluoroethane by fluorinating trichloroethylene, HF is suitably employed as the fluorinating agent. Preferably the reaction is carried out in the gaseous phase. The quantity of HF employed may be from 10 to 100, preferably 15 to 60, moles of HF per mole of trichloroethylene. Where the reaction involves fluorination of 1,1,1-trifluoro-2-chloroethane, the amount of HF may be up to 10 moles, and preferably from 2 to 6 moles, of HF per mole of 1,1,1-trifluoro-2-chloroethane.

The process for the manufacture of 1,1,1,2-tetrafluoroethane may be carried out in accordance with the reaction sequence described and claimed in our prior published European Patent Application No. 449617.

Pentafluoroethane may be produced by any of the processes described in our prior published International Patent Applications WO95/27688 and WO95/16654.

Chlorodifluoromethane [HCFC 22] may be produced by fluorination of chloroform with hydrogen fluoride. The fluorination may take place in the liquid phase in the presence of a fluorination catalyst, for example $SbCl_{(5-x)}F_x$, x=0–5 at temperatures typically between 50° C.–180° C. As desired, intermittent addition of chlorine may be used to maintain the catalyst in the pentavalent state. The reaction pressure can vary widely between subatmospheric pressure to 50 Barg. More preferably the reaction pressure lies within the range 5 Barg–30 Barg. Chloroform and hydrogen fluoride are suitably introduced to a reactor (in either liquid or vapour phase), usually in a molar ratio of about 1:2 to produce a product stream which typically contains chlorodifluoromethane, hydrogen chloride, fluorodichloromethane [HCFC 21] and unreacted hydrogen fluoride. This stream may then be treated, for example by distillation, to remove certain components, for example, hydrogen chloride and fluorochloromethane, and so provide a stream of chlorodifluoromethane and hydrogen fluoride from which hydrogen fluoride may then be recovered by the process according to the first aspect of the invention.

The fluorination reaction using hydrogen fluoride may be carried out in the presence of a catalyst, any conventional catalyst described in the prior art may be employed and will be selected according to the starting materials and the desired fluorine-containing product.

The catalyst may be for example, a metal, for example an s-block metal such as calcium, a p-block metal such as aluminium, tin or antimony, an f-block metal such as lanthanum or a d-block metal such as nickel, copper, iron, manganese, cobalt and chromium or alloys thereof, a metal oxide, for example chromia or alumina, a metal fluoride, for example, aluminium, manganese or chromium fluoride, or a metal oxyfluoride, for example an oxyfluoride of one of the aforementioned metals. The metal in the catalyst is preferably a d- or -p-block metal, and more preferably chromium, aluminium, or a Group V111a metal. The catalyst may be promoted with other metals for example zinc and nickel. If used, the alloy may also comprise other metals, for example molybdenum. Examples of preferred alloys include Hastelloy and stainless steel is especially preferred.

The fluorination catalyst may be conditioned for example by passing substantially dry HF with or without nitrogen diluent over the catalyst at about 250 to 450° C. whilst regeneration of the catalyst may be carried out using a mixture of substantially dry HF and an oxidising gas such as air or oxygen, at a temperature in the range of 300 to 500° C. as disclosed in our prior EP-A-475693.

The process of the invention will now be illustrated with reference to the accompanying drawing which is a schematic representation of a plant for carrying out the process. The process is illustrated in respect of the treatment of a product stream comprising chlorodifluoromethane (HCFC 22] produced by a fluorination process and containing unreacted hydrogen fluoride.

The product stream from a fluorination reactor used to produce HCFC 22 is subjected to primary purification (not shown), for example by distillation and the resulting liquid process stream 1 containing a mixture of hydrogen fluoride and HCFC 22 is mixed with a stream 2 of an extractant comprising a solution of alkali metal fluoride in hydrogen fluoride. The solution of alkali metal fluoride in hydrogen fluoride may be essentially anhydrous or aqueous hydrogen fluoride may be employed as desired. The heat generated during mixing of the streams is removed by heat exchanger 3 and the resulting mixed stream 4 is fed to a vessel 5 in which phase separation occurs to provide an upper HCFC 22 stream 6 containing substantially less hydrogen fluoride than in stream 1 and a lower extractant stream 7 containing more hydrogen fluoride than in stream 2. The upper HCFC 22 stream 6 is withdrawn for further processing (not shown), for example by distillation and/or scrubbing, to recover essentially pure HCFC 22. Any hydrogen fluoride removed from stream 6 during such further processing by distillation may be recycled to the fluorination reactor in which the HCFC 22 is produced or to the hydrogen fluoride separation stage of the process.

The lower extractant stream 7 is withdrawn and fed to a distillation column 8 wherein hydrogen fluoride is separated and removed as stream 9 for collection or for recycle to the fluorination reactor in which HCFC 22 is produced. A bottom stream 10 comprising the extractant solution of alkali metal fluoride in hydrogen fluoride is withdrawn from column 8 and recycled (as stream 2) for mixing with stream 1 in advance of heat exchanger 3.

In an alternative and often preferred embodiment of the process, the column 8 may be replaced by a single-stage flash vessel comprising a reboiler equipped with a condenser.

The process of the invention may be operated as a batch process but preferably is operated as a continuous process.

The invention is illustrated but in no way limited by the following examples.

EXAMPLE 1

A mixture was prepared to the following composition in an evacuated stainless steel pressure vessel (500 ml) and equilibrated at room temperature (approx. 20° C.)

| | |
|---|---|
| chlorodifluoromethane | 140 g |
| hydrogen fluoride | 171.7 g |
| potassium fluoride | 44 g |

The vessel was shaken to ensure thorough mixing of the contents and then allowed to stand for a few minutes to allow phase separation of the contents to occur. After the phases had separated, a sample of the upper organic phase was analysed and was found to contain 2.5% by weight of hydrogen fluoride.

The above procedure was repeated three times and the hydrogen fluoride contents in the organic phase were 2.13, 2%, 25% and 2.32% by weight.

For purposes of comparison, the above procedure was repeated except that the potassium fluoride was omitted. It was observed that the chlorodifluoromethane and hydrogen fluoride were completely miscible and phase separation did not occur.

EXAMPLE 2

The procedure described in Example 1 was repeated using a mixture prepared from a solution (75 g) of caesium fluoride (60% by weight) in hydrogen fluoride and 75 g of chlorodifluoromethane. Three runs were carried out and the hydrogen fluoride contents of the organic phase were 0.223%, 0.24% and 0.32% by weight.

EXAMPLE 3

A mixture was prepared to the following composition:

| | |
|---|---|
| chlorodifluoromethane [HCFC22] | 203 gm |
| hydrogen fluoride | 140 gm |
| potassium fluoride | 100 gm |
| water | 61 gm |

The mixture, representing a typical feed stream 4 in FIG. 1 of the drawing, was charged to an evacuated stainless steel pressure vessel (500 ml) and was equilibrated at room temperature (approx 18°C.). The vessel was then shaken to ensure thorough mixing of the contents and allowed to stand for a few minutes to allow phase separation of the contents to occur. The upper layer was sampled and identified as the organic layer (mainly HCFC 22). Analysis revealed that this layer contained only 0.02% by weight of hydrogen fluoride. The lower layer was sampled and identified as the aqueous layer containing hydrogen fluoride and potassium fluoride. Analysis revealed that this layer contained only 1.2% by weight of HCFC 22.

For purposes of comparison the above procedure was repeated but using a mixture excluding potassium fluoride prepared to the following composition:

| | |
|---|---|
| chlorodifluoromethane [HCFC22] | 201 gm |
| hydrogen fluoride | 144 gm |
| water | 61 gm |

The upper layer was sampled and identified as the organic layer containing HCFC 22 and analysis revealed that this layer contained 0.85% by weight of hydrogen fluoride. The lower layer was sampled and identified as the aqueous layer containing hydrogen fluoride and analysis of this layer revealed that it contained 10.3% by weight of HCFC 22.

EXAMPLE 4

The procedure described in Example 3 was used to treat a mixture prepared to the following composition:

| | |
|---|---|
| chlorodifluoromethane [HCFC22] | 201 gm |
| hydrogen fluoride | 105 gm |
| potassium fluoride | 100 gm |
| water | 100 gm |

The upper layer was sampled and identified as the organic layer containing HCFC 22 and analysis revealed that this layer contained 0.0019% by weight of hydrogen fluoride. The lower layer was sampled and identified as the aqueous layer containing hydrogen fluoride and potassium fluoride and analysis revealed that this layer contained 2.2% by weight of HCFC 22.

For purposes of comparison the above procedure was repeated but using an extractant solution excluding potassium fluoride and prepared to the following composition:

| | |
|---|---|
| chlorodifluoromethane [HCFC22] | 201 gm |
| hydrogen fluoride | 109 gm |
| water | 103 gm |

The upper layer was sampled and identified as the aqueous layer containing hydrogen fluoride and analysis of this layer revealed that it contained 14.2% by weight of HCFC 22. The lower layer was sampled and identified as the organic layer containing HCFC 22 and analysis revealed that this layer contained 0.53% by weight of hydrogen fluoride.

The results of Examples 3 and 4 show that the addition of potassium fluoride to aqueous hydrogen fluoride results in more efficient separation of HCFC 22 and hydrogen fluoride than when aqueous hydrogen fluoride alone is used as the extractant. The results of Example 4 farther show that adding potassium fluoride to a 51% aqueous solution of hydrogen fluoride increases the density of the solution such that on phase separation the aqueous layer is the lower layer whilst in the absence of potassium fluoride the aqueous layer on phase separation is the upper layer.

The results of Examples 3 and 4 also illustrate that aqueous hydrogen fluoride (without potassium fluoride) separates out as either the lower layer or the upper layer depending upon the concentration of hydrogen fluoride in the solution. Thus at 70 weight/weight % concentration of hydrogen fluoride as in Example 3 the aqueous hydrogen fluoride layer (without potassium fluoride) is the lower layer whilst at 51 weight/weight % concentration as in Example 4 the aqueous hydrogen fluoride layer (without potassium fluoride) is the upper layer i.e. the density of aqueous hydrogen fluoride changes from below that of HCFC 22 at 51% concentration to above that of HCFC 22 at 70% concentration. This means that use of aqueous hydrogen fluoride (without potassium fluoride) as extractant requires great care to be exercised in monitoring and controlling the density of the extractant solution and is not very practical for operation on a large scale. By contrast, addition of potassium fluoride to the aqueous hydrogen fluoride solution provides an extractant solution which is always separated as the lower phase and the process does not require precise monitoring and control of the density of the extractant solution.

EXAMPLE 5

A mixture was prepared to the following composition in an evacuated stainless steel pressure vessel (300 ml ) and equilibrated at room temperature (approx. 20° C.)

| 1,1,1,2-tetrafluoroethane | 116 g |
| 1-chloro-2,2,2-trifluoro ethane | 13.3 g |
| hydrogen fluoride | 30 g |
| caesium fluoride | 34 g |

The vessel was shaken to ensure thorough mixing of the contents and then allowed to stand for a few minutes to allow phase separation of the contents to occur. After the phases had separated, a sample of the upper organic phase was analysed and was found to contain 0.14% by weight hydrogen fluoride.

For the purposes of comparison the above procedure was repeated but using a mixture excluding the caesium fluoride, prepared to the following composition:

| 1,1,1,2-tetrafluoroethane | 137 g |
| 1-chloro-2,2,2-trifluoro ethane | 17 g |
| hydrogen fluoride | 74 g |

The sample taken this time was found to contain 19.8% by weight hydrogen fluoride.

What is claimed is:

1. A process for separating and recovering hydrogen fluoride from an azeotropic or near azeotropic mixture of an organic compound and hydrogen fluoride which comprises contacting the azeotropic or near azeotropic mixture in the liquid phase with a solution of an alkali metal fluoride of from about 20% to about 80% by weight in hydrogen fluoride, effecting phase separation of an upper organic phase and a lower hydrogen fluoride phase containing alkali metal fluoride and recovering hydrogen fluoride from the lower hydrogen fluoride phase.

2. A process for separating and recovering hydrogen fluoride from an azeotropic or near azeotropic mixture of an organic compound and hydrogen fluoride which comprises contacting the azeotropic or near azeotropic mixture in the liquid phase with an essentially anhydrous solution of an alkali metal fluoride of from about 20% to about 80% by weight in hydrogen fluoride, effecting phase separation of an upper organic phase and a lower hydrogen fluoride phase containing alkali metal fluoride and recovering hydrogen fluoride from the lower hydrogen fluoride phase.

3. A process for separating and recovering hydrogen fluoride from an azeotropic or near azeotropic mixture of an organic compound and hydrogen fluoride which comprises contacting the azeotropic or near azeotropic mixture in the liquid phase with a solution of an alkali metal fluoride of from about 20% to about 80% by weight in aqueous hydrogen fluoride, effecting phase separation of an upper organic phase and a lower hydrogen fluoride phase containing alkali metal fluoride and recovering hydrogen fluoride from the lower hydrogen fluoride phase.

4. A process as claimed in claim 1 wherein the alkali metal fluoride comprises potassium fluoride and/or caesium fluoride.

5. A process as claimed in claim 1 wherein hydrogen fluoride is recovered from the lower hydrogen fluoride phase by distillation.

6. A process as claimed in claim 5 in which the distillation is carried out in a flash vessel or a distillation column.

7. A process as claimed in claim 1 in which at least part of any residual hydrogen fluoride-containing alkali metal fluoride which remains after recovering hydrogen fluoride from the lower hydrogen fluoride phase is recycled for contact with the mixture to be separated.

8. A process as claimed in claim 1 in which hydrogen fluoride is recovered from a mixture containing a minor proportion of hydrogen fluoride.

9. A process as claimed in claim 8 in which the said mixture to be treated contains less than 25% by weight of hydrogen fluoride.

10. A process as claimed in claim 1 in which a stream comprising hydrogen fluoride is derived from the upper organic phase and is recycled to the reactor in which an organic compound is produced and/or to a stream comprising the organic compound.

11. A process as claimed in claim 1 in which the organic compound comprises a halogen-containing organic compound.

12. A process as claimed in claim 9 in which said mixture to be treated contains less than about 10% by weight of hydrogen fluoride.

13. A process as claimed in claim 1, in which the process is continuous.

14. A process for separating and recovering hydrogen fluoride from a mixture of an organic compound and hydrogen fluoride comprising:

a) providing a first liquid stream comprising an organic compound and hydrogen fluoride;

b) combining said first liquid stream with a second liquid stream comprising a solution of an alkali metal fluoride of from about 20% to about 80% by weight in hydrogen fluoride;

c) effecting phase separation of an upper organic phase and a lower hydrogen fluoride phase containing alkali metal fluoride; and d) recovering hydrogen fluoride from the lower hydrogen fluoride phase.

15. The process as claimed in claim 14 comprising combining said first and second streams by introducing said second stream into said first stream.

16. The process as claimed in claim 14 comprising combining said first and second streams by separately introducing said first and second streams into a vessel.

* * * * *